(12) United States Patent  
Musetti (10) Patent No.: US 8,592,063 B1
(45) Date of Patent: Nov. 26, 2013

(54) BATTERY PACK PRESSURE VALVE

(75) Inventor: Louis Jack Musetti, Laguna Beach, CA (US)

(73) Assignee: Vecture, Inc., Concord (CA)

( * ) Notice: Subject to any disclaimer, the term of this patent is extended or adjusted under 35 U.S.C. 154(b) by 0 days.

(21) Appl. No.: 13/482,795

(22) Filed: May 29, 2012

(51) Int. Cl.
*H01M 10/42* (2006.01)
*H01M 10/34* (2006.01)
*H01M 10/52* (2006.01)
*H01M 2/12* (2006.01)

(52) U.S. Cl.
USPC .................. 429/53; 429/57; 138/31; 138/30; 138/26; 138/43; 138/46; 137/511; 137/543.21

(58) Field of Classification Search
USPC .............. 429/53–56, 57–60, 71–21, 82, 163, 429/176; 92/34–38; 137/223–225, 251, 137/543.21, 511; 29/454; 417/472, 474, 417/479, 454; 138/26, 30, 31, 43, 46
See application file for complete search history.

(56) References Cited

U.S. PATENT DOCUMENTS 6,286,552 B1 * 9/2001 Shimbori et al. ............... 138/31
2011/0045324 A1 * 2/2011 Kritzer et al. .................. 429/53

* cited by examiner

*Primary Examiner* — Basia Ridley
*Assistant Examiner* — Caitlin Wilmot (57) ABSTRACT

Various embodiments are described herein for a pressure valve for a battery pack comprising a housing that has a cavity, a first plate inside the cavity and an expansible chamber inside the cavity between the first plate and the bottom of the housing. The first plate and the expansible chamber have openings that are in fluid communication with a gas inside the battery pack. The expansible chamber is deformable in order to contract or expand in response to changes in pressure in the gas within the battery pack and the first plate is movable relative to the bottom of the housing.

19 Claims, 8 Drawing Sheets

BATTERY PACK PRESSURE VALVE

FIELD

The various embodiments described herein generally relate to a pressure valve that can be used with a battery pack to provide protection from the external environment while providing pressure relief.

BACKGROUND

A battery pack typically comprises one or more battery cells that are encased within a housing of the battery pack. During normal operation a battery pack may undergo temperature fluctuations. For example, when power is drawn from the battery pack, the battery pack typically generates heat and the internal temperature of the battery pack may rise. Also, after power ceases to be drawn from a battery pack, heat may dissipate from the battery pack, and the internal temperature of the battery pack may fall.

The battery pack typically contains air that can expand and contract in response to the internal temperature fluctuations. When the internal temperature rises, the air may expand and when the internal temperature falls, the air may contract. Accordingly, if the air is confined to the interior of the battery pack, the pressure of the air can rise and fall with the internal temperature. In some cases, the battery pack will outgas as the internal temperature rises and when the battery pack cools, the outside ambient air of the surrounding environment of the battery pack can enter the battery pack and cause degradation to the internals of the battery pack due to moisture and other non-compliant intrusions. In addition, efficiency of the battery pack may be lessened when the internal air pressure rises or falls beyond a certain value. In some cases, if the internal air pressure rises beyond a critical value, the battery pack may be damaged. For example, the housing of the battery pack may burst, which is dangerous and costly.

SUMMARY OF VARIOUS EMBODIMENTS

In one aspect, in at least one embodiment described herein, there is provided a pressure valve for a battery pack comprising a housing comprising a first bottom wall and a first sidewall in contact with the first bottom wall to define a cavity; a first plate inside the cavity, wherein the first plate comprises a first opening, the first plate being movable relative to the first bottom wall, and the first plate being biased away from the first bottom wall; and an expansible chamber positioned inside the cavity between the first bottom wall and the first plate having an opening that is in fluid communication with a gas inside the battery pack, wherein the expansible chamber is deformable in order to contract or expand in response to changes in pressure in the gas within the battery pack.

In at least some embodiments, the chamber comprises opposite first and second ends, a closed second bottom at the second end, a second opening at the first end, and a second sidewall extending from the first end toward the second end, the second sidewall being sealed to the first plate at the first end and the second sidewall defining the second opening at the first end, and the second opening overlaps with the first opening.

In at least some embodiments, the chamber comprises a bellows having a folding sidewall.

In at least some embodiments, the chamber is automatically deformable to increase in volume when the chamber receives gas due to a high gas pressure within the battery pack.

In at least some embodiments, the chamber is automatically deformable to decrease in volume when the chamber loses gas due to a low gas pressure within the battery pack.

In at least some embodiments, the first plate is biased away from the first bottom wall by a resiliently compressible member.

In at least some embodiments, the resiliently compressible member is a spring held in compression between the first bottom wall and the first plate.

In at least some embodiments, the pressure valve further comprises a second plate between the first plate and the first bottom wall, wherein the resiliently compressible member is a spring held in compression between the first plate and the second plate.

In at least some embodiments, the position of the second plate relative to the first bottom wall is adjustable.

In at least some embodiments, the pressure valve further comprises an adjustment mechanism that is manipulable to selectively position the second plate relative to the first bottom.

In at least some embodiments, the adjustment mechanism comprises an elongated threaded member that is rotatable to extend through a hole in the first bottom wall to engage the second plate.

In at least some embodiments, the first plate further comprises a third opening, and the third opening does not overlap with the second opening.

In at least some embodiments, the first plate comprises opposite first and second sides, a second sidewall of the chamber is sealed to the first side of the first plate, the first plate comprises a sealing member on the second side, and the sealing member surrounds the first opening intermediate the first opening and the third opening.

In at least some embodiments, the first plate comprises opposite first and second sides, a second sidewall of the chamber is sealed to the first side of the first plate, and the first plate is configured to move towards the first bottom wall when a high pressure gas is incident on the second side and exceeds a threshold pressure defined by the resiliently compressible member.

In at least some embodiments, the housing further comprises a flange comprising through-holes, and the through-holes are sized to receive connectors to connect the pressure valve to the battery pack.

In at least some embodiments, the second sidewall and the second bottom are substantially gas impermeable.

In at least some embodiments, the first bottom wall comprises a fourth opening defining a gas outlet.

In at least some embodiments, the first bottom wall comprises a fourth opening defining a gas outlet, and the third opening, a space between the chamber and the first sidewall, and the gas outlet together define a gas flow path during a gas outflow event.

In another aspect, in at least one embodiment described herein, there is provided a pressure valve for a battery pack, wherein the pressure valve comprises a chamber in fluid communication with a gas inside the battery pack, wherein the chamber is deformable to modulate gas pressure inside the battery pack; and a plate connected with the chamber, wherein the plate is biased to provide a seal to the battery pack when the gas pressure is below a threshold value; and the plate is biased to unseal from the battery pack, when the gas pressure is greater than the threshold value, wherein the gas is sealed from the surrounding environment when the plate is sealed to the battery pack; and the gas vents to the surrounding environment when the plate is unsealed from the battery pack.

In another aspect, in at least one embodiment described herein, there is provided a pressure valve for a battery pack, wherein the pressure valve comprises a housing having a bottom wall in contact with side walls defining a cavity therein; and an expansible chamber being gas impermeable and disposed within the cavity, wherein the expansible chamber is in fluid communication with a gas inside the battery pack; and wherein the expansible chamber is configured to move according to equalize gas pressure inside the battery pack with an ambient gas pressure in an environment surrounding the battery pack and to prevent external gas from the surrounding environment from entering the battery pack.

BRIEF DESCRIPTION OF THE DRAWINGS

For a better understanding of the various embodiments described herein, and to show more clearly how these various embodiments may be carried into effect, reference will now be made, by way of example, to the accompanying drawings which show at least one example embodiment, and in which.

DETAILED DESCRIPTION OF THE EMBODIMENTS

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicant, inventor or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

In conventional battery packs, some manufacturers equilibrate air pressures inside the battery pack with the external environment by using a hole that is formed in the battery pack housing. The hole may allow air to exit the battery pack to the surrounding environment when the internal temperature and internal air pressure rises. Likewise, the hole may also allow ambient air from the surrounding environment to enter the battery pack when the internal temperature and internal air pressure falls. In this case, while the hole may be effective for equilibrating internal gas pressures, it may create problems. For instance, ambient air which enters the battery pack may carry with it contaminants such as moisture and salt. The contaminants may interfere with and corrode internal battery pack components (e.g. electrochemical cells, electrical connections and electronics). Also, a hole does not permit the composition of the gas inside the battery pack to be controlled. For example, it may be desirable for a battery pack to be filled with Argon or another gas. However, with a hole in the battery pack, the Argon gas will likely be rapidly diluted with the ambient air.

Some manufacturers use a burst disk to equilibrate excess internal air pressures. A burst disc may be configured to rupture when exposed to a predetermined pressure differential between the internal and external environments of the battery pack. Accordingly, a burst disc may be configured to rupture in response to a critical internal air pressure within the battery pack, which may occur when one or more of the cells in the battery pack fails and overheats. Below that critical pressure value, the air pressure inside the battery pack may be permitted to rise and fall with the internal temperature fluctuations. However, if the burst disc has ruptured, a hole is formed in the battery pack. This hole may present the same problems mentioned above.

Some manufacturers provide battery packs which comprise a one-way valve to compensate for excess-internal air pressure. The one-way valve is typically configured to temporarily open when exposed to a pressure in the battery pack that is higher than the pressure in the external environment of the battery pack. The valve may re-close once this pressure differential dissipates. This may be effective for keeping the internal air pressure within the battery pack below a predetermined value. However, after the air vents and the internal temperature falls, the internal air pressure may fall below the ambient pressure due to the lost quantity of air but in this case the one-way valve cannot be used to equalize the internal pressure within the battery pack and the external pressure within the surrounding environment.

Figure 1:
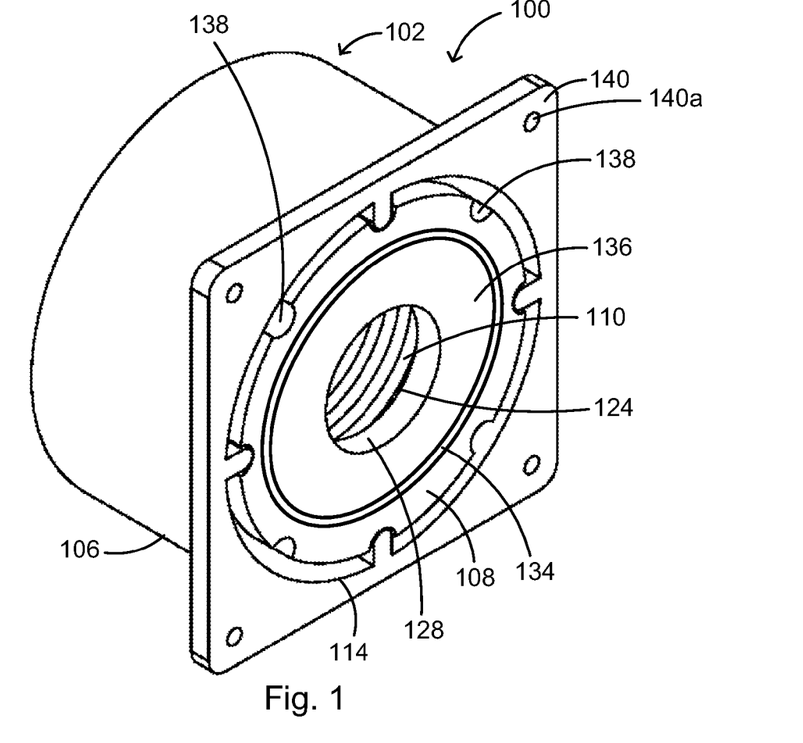
FIG. 1 is a front perspective view of an example embodiment of a pressure valve that can be used with a battery pack.
Figure 2:
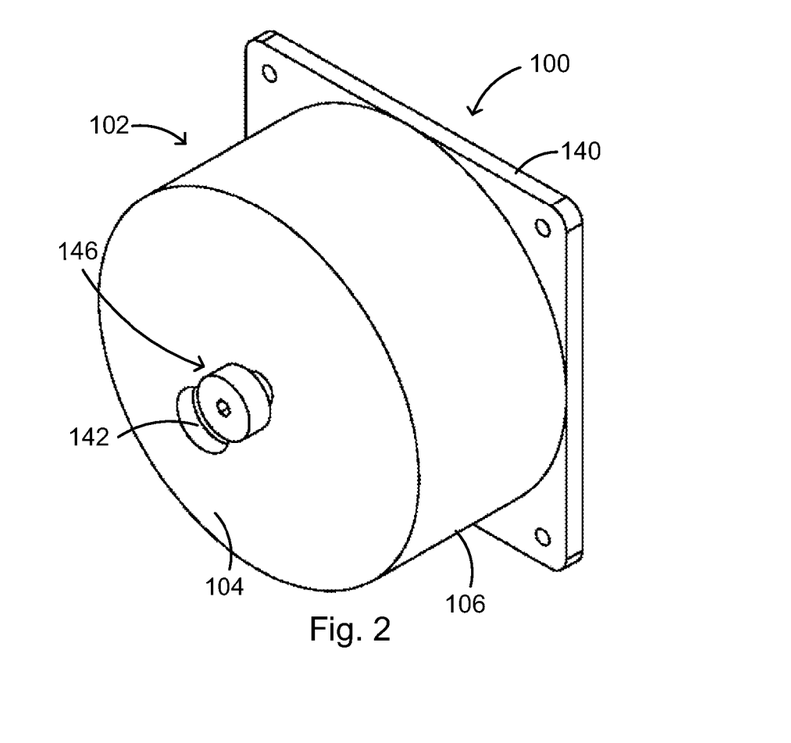
FIG. 2 is a rear perspective view of an example embodiment of a pressure valve.
Figure 3A:
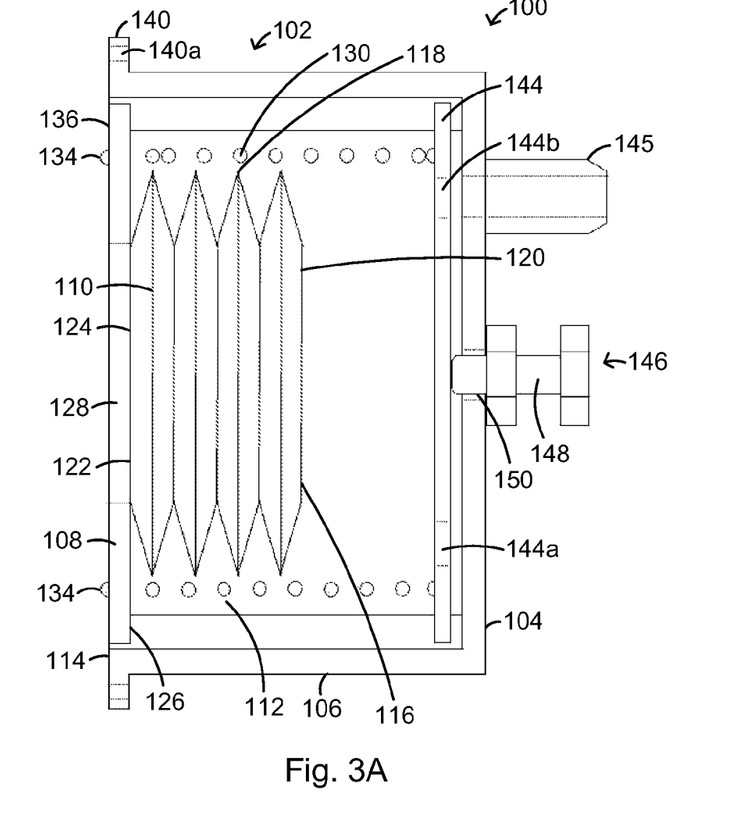
FIG. 3A is a cross-sectional view of an example embodiment of a pressure valve.
Figure 3B:
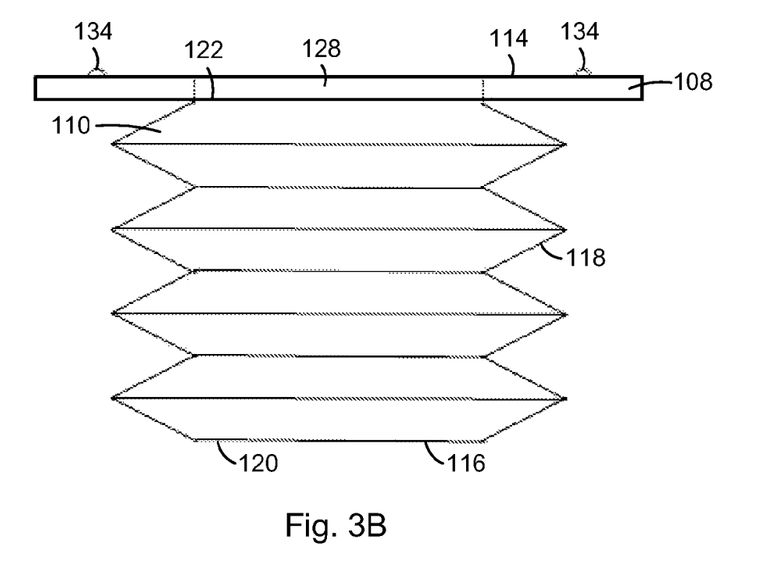
FIG. 3B is a side view of an example embodiment of an expansible chamber that can be used with a pressure valve.
Figure 3C:
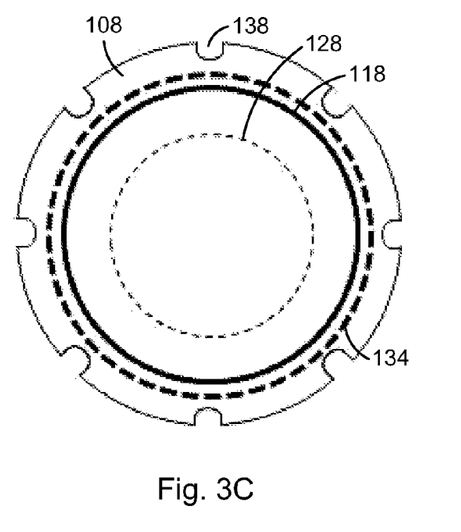
FIG. 3C is a bottom view of an example embodiment of a plate that can be used with an expansible chamber.
Figure 3D:
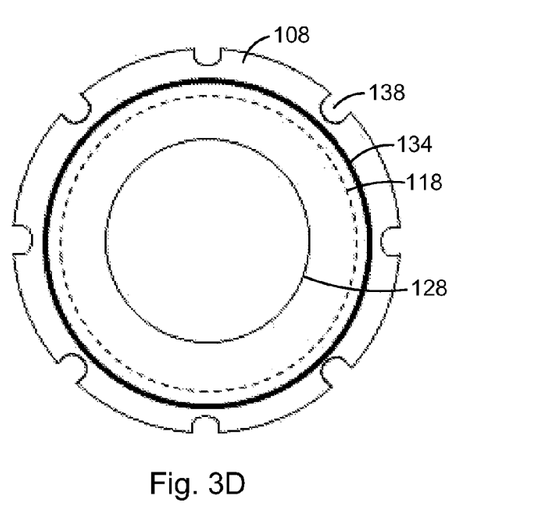
FIG. 3D is a top view of the plate of FIG. 3C.
Figure 3E:
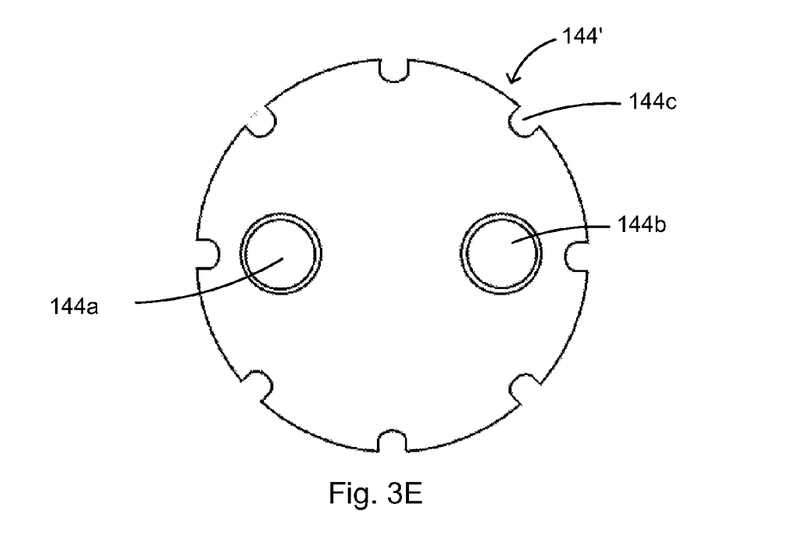
FIG. 3E is an illustration of an example embodiment of a pressure plate that can be used with a pressure valve.
Figure 3F:
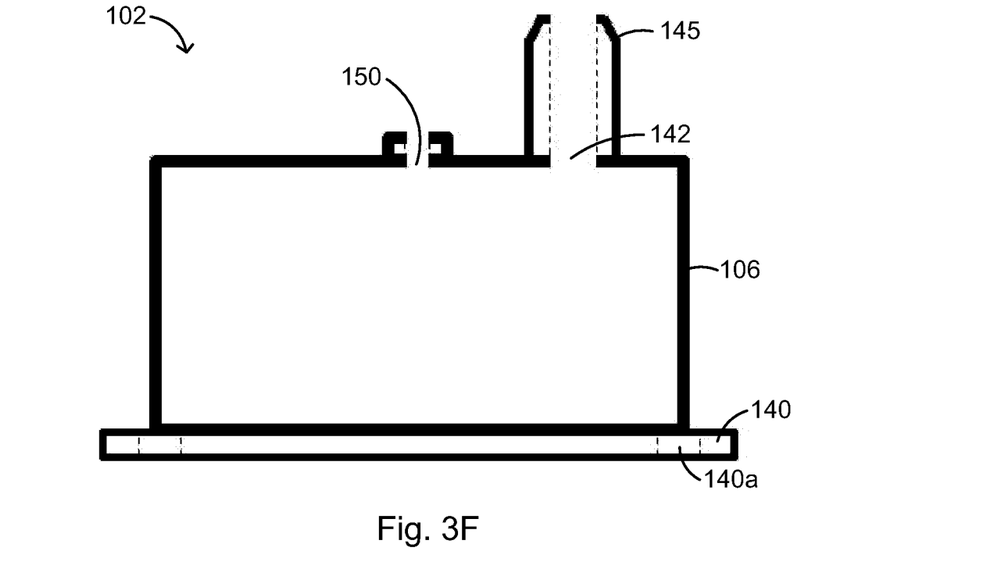
FIG. 3F is a side view of an example embodiment of a housing that can be used for the pressure valve.
Figure 3G:
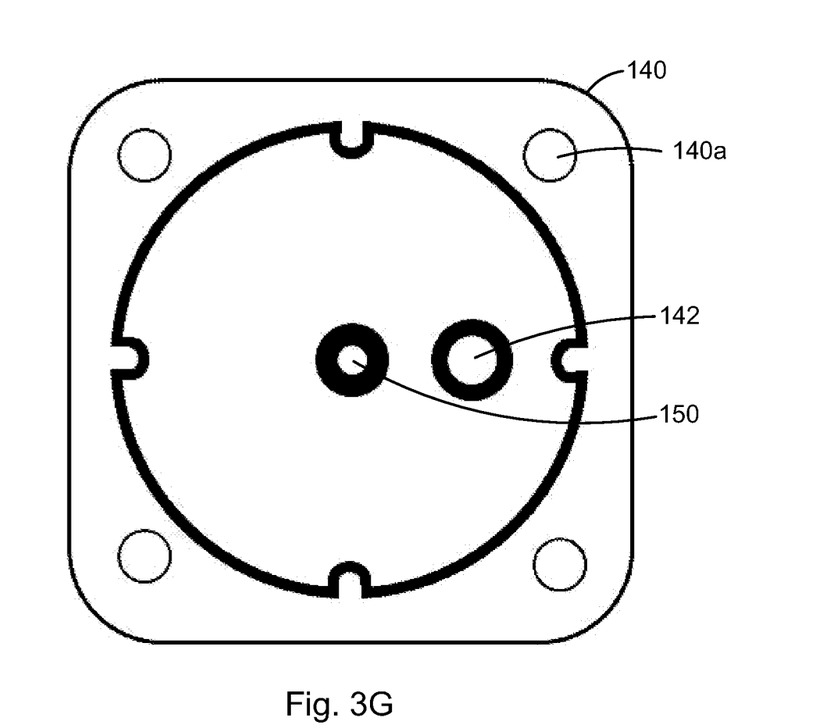
FIG. 3G is a bottom view of the housing of FIG. 3F.
Figure 4:
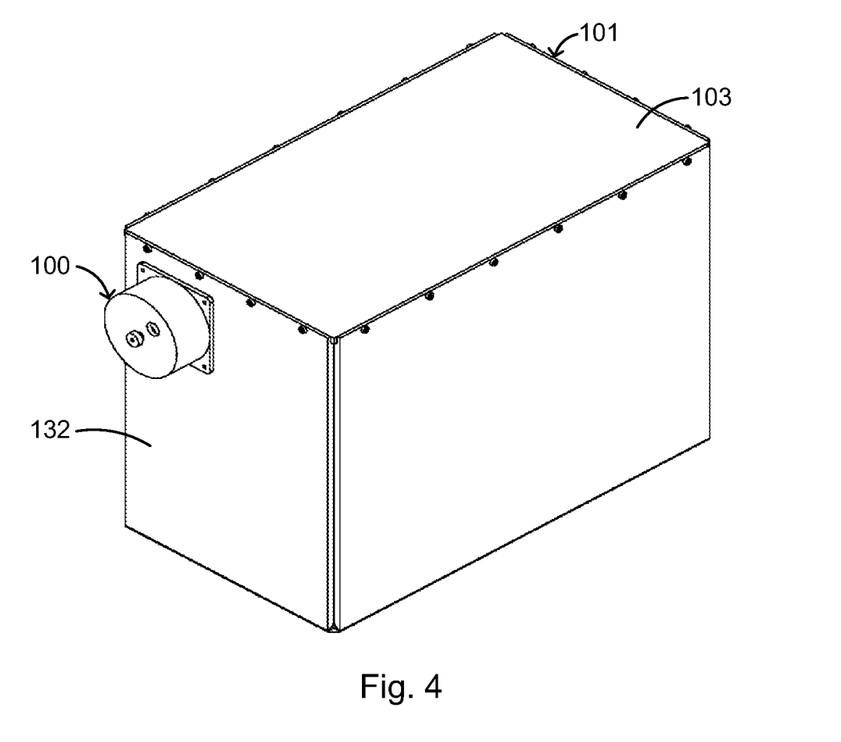
FIG. 4 is a perspective view of an example embodiment of a pressure valve mounted to a battery pack.

FIGS. 1-3G illustrate an example embodiment of a pressure valve 100 that can be used with a battery pack. FIG. 4 illustrates an example embodiment of a battery pack 101 installed with the pressure valve 100. FIGS. 5A-5D illustrate an example embodiment of the pressure valve 100 during operation.

The battery pack 101 comprises a housing 103 that contains an internal volume of gas. The housing 103 comprises an opening (not shown in FIG. 4) that is in fluid communication with the internal volume of gas. The pressure valve 100 provides a seal around the opening thus controlling the entry and escape of gas through the opening and therefore the pressure within the battery pack 101. The housing 103 is generally otherwise sealed from the external environment.

The pressure valve 100 assists in relieving any internal gas pressure of the battery pack 101 that is greater than the ambient pressure of the environment surrounding the battery pack 101. In at least some embodiments, the pressure valve 100 comprises an expansible chamber that is in fluid communication with the internal volume of gas. The expansible chamber is generally configured to expand and contract in response to changes in the internal gas pressure of the battery pack 101. For example, when the internal gas pressure rises above the ambient external gas pressure (e.g. because of increases in the internal temperature of the battery pack 101 during operation), the expansible chamber expands. It is the nature of gases to expand and occupy all contiguous volumes of space. Therefore, as the expansible chamber expands, the gas within the battery pack 101 may expand to occupy the enlarging chamber volume. The expansion of the gas into the expansible chamber may cause the internal gas pressure with the battery pack 101 to fall. In some alternative embodiments, for certain applications, it may be possible to use a pressure valve in which the chamber is not expansible.

Similarly, when the internal gas pressure falls below the ambient gas pressure (e.g. because of decreases in the internal temperature of the battery pack 101), the expansible chamber may contract thus compressing the gas and raising the internal gas pressure within the battery pack 101. Thus, the capacity of the expansible chamber to expand and contract in response to changes in the internal gas pressure may assist with equalizing the internal gas pressure within the battery pack 101 with the ambient pressure in the surrounding environment. Furthermore, because the expansible chamber can aid towards equilibrating internal gas pressures with external ambient pressure without introducing ambient external gases into the battery pack 101, the risk of introducing contaminants into the battery pack 101 is avoided.

The expansible chamber generally comprises operational limits. There may be a maximum extent to which the expansible chamber may expand, and a maximum extent to which the expansible chamber may contract. In some cases, it may be desirable to size the expansible chamber such that it may expand and contract to accommodate a full gambit of normal internal gas pressures that are expected within the battery pack 101 during operation. Accordingly, in at least some cases, the pressure valve 101 can be used therefore equilibrate both elevated internal gas pressures and sub-ambient internal gas pressures.

However, there can be instances in which extraordinary internal gas pressures develop, such as during the failure of an electrochemical cell, for example. In such situations, the expansible chamber may expand until it is fully expanded, then it may not be able to equilibrate further increases in pressure. Accordingly, in at least some embodiments, the pressure valve 100 comprises another mechanism for accommodating larger increases in internal gas pressure within the battery pack 101 than are normally encountered. At extraordinary pressures, the pressure valve 100 has a component that operates in a somewhat similar fashion to a one-way valve which allows the pressure valve 100 to vent extra gas from the battery pack 101 whenever the internal pressure rises above a critical value during an outgas event. However, unlike a one-way valve, the pressure valve 100 at least partially compensates for the lost quantity of gas after the battery pack 101 cools and the internal gas pressure falls. The expansible chamber may contract to raise a sub-ambient internal pressure toward ambient pressure. The expansible chamber can accomplish this task without introducing ambient gas into the battery pack 101, and therefore without introducing contaminants into the battery pack 101.

In the example embodiment shown, the pressure valve 100 comprises a housing 102 which houses a first plate 108 and an expansible chamber 110. The housing 102 comprises a cylindrical shape, as shown. However, in alternative embodiments the housing 102 can have other shapes. For example, the housing 102 may have a cubic shape or an irregular shape in alternative embodiments. In the example embodiment shown, the housing 102 also comprises a bottom wall 104, an open top wall 114 and a side wall 106. The side wall 106 extends from the bottom wall 104 to the open top wall 114. The term "open top wall" is meant to describe a wall, plate or surface that has an opening or orifice.

The housing 102 may be formed of any one or more of a plurality of materials such as plastics, metals, ceramics and elastomers, for example. The housing 102 may be rigid or somewhat flexible depending on the particular application. In some embodiments, the housing 102 comprises a substantially gas impervious material. For example, the housing 102 may comprise cast aluminum. Alternatively, in some embodiments, the housing 102 may comprise a substantially gas pervious material. For example, the housing 102 may comprise a porous woven fabric. In general, the gas pervious material that is used is made such that it will not let any contaminants into the battery pack 101.

The housing 102 encloses a cavity 112 that is defined by the bottom wall 104, the side wall 106, and the open top wall 114. The first plate 108 and the expansible chamber 110 are generally positioned inside cavity 112. In the example embodiment shown, the expansible chamber 110 is positioned between the bottom wall 104 and the first plate 108, and the first plate 108 is initially positioned to be flush with upper shoulders, ridges or flanges 140 of the side wall 106.

The expansible chamber 110 is generally substantially gas impermeable. The expansible chamber 110 is configured to expand to an expanded position when the gas pressure inside the expansible chamber 110 (due to the gas pressure within the battery pack 101) is greater than the ambient gas pressure outside of the expansible chamber 110 (i.e. outside of the battery pack). The expansible chamber 110 is configured to contract to a contracted position when the gas pressure inside the expansible chamber 110 is less than the ambient gas pressure outside of the expansible chamber 110. At ambient pressure, the expansible chamber 110 is generally substantially at a half-way or neutral position (see FIG. 5A for example) that is between a fully expanded position (see FIG. 5B for example) and a fully contracted position (see FIG. 5C for example).

When the expansible chamber 110 expands to an expanded position due to an increase in gas pressure inside the battery pack 101, this ensures that no moisture can enter the battery pack 101 and further allows for controlled gases to be used in the battery pack 101. These gases may include dried air, inert gas and other gasses such as Argon or Nitrogen.

As discussed briefly above, the expansible chamber 110 is generally positioned to be in fluid communication with a volume of gas inside the housing 103 of the battery pack 101 to assist with equilibrating changes between the internal gas pressure and the ambient pressure of the surrounding environment. In the example embodiment shown in FIG. 4, the opening 124 of the expansible chamber 110 is aligned with an opening (not shown) in the housing 103. The expansible chamber 110 may expand when gas pressure inside the battery pack 101 rises and the expansible chamber 110 may contract when gas pressure inside the battery pack 101 falls.

The expansible chamber 110 is generally deformable to permit the volume inside the expansible chamber 110 to vary with changes in the internal pressure within the battery pack 101. Accordingly, the extendable chamber 110 can be used to modulate the internal pressure within the battery pack 101. In the example embodiment shown, the expansible chamber 110 comprises a bellows comprising a bottom 116 and foldable side walls 118. In some embodiments, the expansible chamber 110 comprises other elastic members. For example, the expansible chamber 110 may comprise a bottom 116 and elastically stretchable side walls 118. In some embodiments, substantially the entirety of the expansible chamber 110 may be elastic. For example, the expansible chamber 110 may be balloon-like. Generally, the expansible chamber 110 comprises any one or more of materials such as, for example, metals, fiber impregnated meshes, or elastomers such as neoprene, Buna N, polyethylene, polypropylene, polyurethane, or silicon, for example.

The expansible chamber 110 extends from a first end 120 at the bottom 116 to a second end 122 at first plate 108. In some embodiments, the expansible chamber 110 and the first plate 108 may be integrally formed. The side walls 118 may define an opening 124 in the expansible chamber 110 at the second end 122. The side walls 118 may be sealed to a first side 126 of the first plate 108 at the second end 122 of the expansible chamber 110. In some embodiments, the seal is generally gas impermeable such that gas may not escape at the interface of the expansible chamber 110 and the first plate 108. In some embodiments, the first plate 108 contains apertures 108a to provide an air path during an outgas event.

The first plate 108 generally comprises an opening 128 that is aligned with the opening 124 of the expansible chamber 110. The opening 128 may be smaller than or equal in size to the opening 124. In some embodiments, all of the opening 128 may overlap with the opening 124 whereas in other embodiments the openings 128 and 124 may partially overlap. The interface between the expansible chamber 110 and the first plate 108 generally surrounds opening 128.

In at least some embodiments, the first plate 108 is biased away from the bottom wall 104 of the housing 102 by a biasing member 130. In the example embodiment shown, the pressure valve 100 comprises a spring that acts as the biasing member 130 inside the housing 102. The spring 130 may be held in compression between the first plate 108 and the bottom wall 104. In some embodiments, the pressure valve 100 may comprise a different biasing mechanism. For example, the pressure valve 100 may comprise a resiliently compressible member such as a pneumatic piston or a resiliently extensible member such as an elastic.

In the example embodiment shown in FIG. 4, the biasing member 130 may press the first plate 108 against the outer surface 132 of the battery pack 101. The biasing member 130 generally presses with sufficient force to form a seal at the interface of the first plate 108 and the outer surface 132. This may prevent gas from escaping laterally through the interface between the first plate 108 and the outer surface 132 of the battery pack 101. In other embodiments, the biasing member 130 has a strength or resiliency such that the biasing member 130 is deformable under an outgas event, as will be described in more detail with regards to FIG. 5D below.

In at least some embodiments, a sealing member 134 may be used to improve the seal between the first plate 108 and the outer surface 132. In the example shown, the second side 136 of the first plate 108 comprises an O-ring which acts as the sealing member 134. The sealing member 134 generally surrounds both the opening 128 and the opening (not shown) in the outer surface 132 of the housing 103 of the battery pack 101. The sealing member 134 may be compressed when the first plate 108 is pressed against the outer surface 132, thus forming a fluid-tight seal.

As explained above, the expansible chamber 110 may expand to assist with reducing rising internal gas pressures within the battery pack 101. However, there is a limit to how much the expansible chamber 110 can expand. In some embodiments, the expansible chamber 110 may be sized to equalize for a maximum expected internal gas temperature. However, in some cases, such as a battery cell failure, the internal gas temperature may rise beyond that for which the expansible chamber 110 may compensate. In these circumstances, the expansible chamber 110 may become fully expanded and the internal gas pressure may rise without equalization. In other embodiments, the pressure valve incorporates another mechanism to deal with situations that cause an outgas event such as battery cell failure.

As the internal gas pressure rises, the pressure gradient across the first plate 108 also rises. At least a portion of the second side 136 of the first plate 108 (inward of the seal between the first plate 108 and the outer surface 132 of the battery pack 101) may be exposed to the internal gas pressure. At least a portion of the first side 126 (facing the inside of the chamber 110) may be exposed to the pressure of the surrounding environment (e.g. ambient pressure). During an outgas event, this pressure differential resolves itself as a force on the first plate 108 which acts against the bias strength of the biasing member 130. If the pressure differential increases large enough, the force will overcome the bias of the biasing member 130 which then causes the plate 108 to move toward the bottom wall 104 of the housing 102 and away from the outer surface 132 of the battery pack 101. This separates the plate 108 from the outer surface 132 of the battery pack 101.

When the first plate 108 is unsealed from or moves away from the outer surface 132, internal gas from the battery pack 101 may vent out into the surrounding environment. This may help to equalize the internal gas pressure of the battery pack 101 during an outgas event. Also, the ambient gas is not permitted from entering into the battery pack 101 after the outgas event, so that the battery pack 101 is protected from external contaminants.

In the example embodiment shown, the housing 102 comprises a flange 140 for securing the pressure valve 100 to the battery pack 101. As shown, the flange 140 extends laterally from the open top wall 114 of the housing 102. The flange 140 includes apertures 140a through which fasteners or connectors can pass to secure the flange 140, and therefore the pressure valve 100, to the battery pack 101.

In some embodiments, the flange 140 may not form a gas-tight seal around the open top wall 114, with the outer surface 132 to which it is secured. In these embodiments, the internal gas from the battery pack 101 may vent to the surrounding environment by following a path through the interface between the flange 140 and the outer surface 132 of the housing 103 of the battery pack 101 and out through the pressure valve 100, when the first plate 108 is unsealed from the outer surface 132. When the outgas event happens, the internal temperature is high within the battery pack 101 and the chamber 110 is fully extended. When the battery pack 101 cools, the chamber 110 will retract as much as it can after which there may be a bit of an internal vacuum if the chamber 110 does not have enough volume to accommodate the change in internal pressure within the battery pack 101.

In at least some embodiments, the flange 140 forms a gas-tight seal with the outer surface 132 of the housing 103 of the battery pack 101 to which it is secured. The flange 140 thus prevents gas from escaping through the interface between the flange 140 and the outer surface 132. In these embodiments, the pressure valve 100 comprises a flow path through the cavity 112 to the surrounding environment during an outgas event (see FIG. 5D). Accordingly, in the example embodiment shown, when the first plate 108 is unsealed from the outer surface 132, the pressure valve 100 comprises a flow path defined by second openings 138 in the first plate 108, the space in the cavity 112 between the expansible chamber 110 and the side wall 106, and an opening 142 in the bottom wall 104. The second openings 138 provide inlets into the cavity 112, outside of the expansible chamber 110. The opening 142 provides an outlet from the cavity 112 to the surrounding environment. Although there may be some instances in which contaminants can enter the housing 102 of the pressure valve 100, the contaminants are on the opposite side of the chamber 110 and the chamber 110 is sealed against the housing 103 of the battery pack 101. Accordingly, the contaminants cannot enter the battery pack 101 through the opening 142. When the first plate 108 is unsealed from the outer surface 132, internal gas from the battery pack 101 generally enters the cavity 112 through the second openings 138 and exit from the cavity 112 to the surrounding environment through the opening 142.

In at least some embodiments, the pressure valve 100 further comprises a nozzle 145 or outlet channel that is in fluid communication with the opening 142 of the bottom wall 104. Without a nozzle, the pressure valve 100 that is mounted on a high power battery pack would require a manual connection to capture any gas that is vented from the pressure valve 100. With the nozzle 145, the battery pack 101 can be slid into a rack system and the nozzle 145 can slip into a tube that has an elastomer grommet so there is no need to have a manual connection as when installing the electrical connection of the battery pack 101.

In some embodiments, the opening 142 may be configured to connect with a conduit (not shown), possibly through the nozzle 145. The conduit may direct vented gas to a controlled external environment, for example. In some embodiments, the housing 102 may comprise a gas permeable material instead of or in addition to the opening 142. In these embodiments, gas entering the cavity 112 (outside of the expansible chamber 110) may vent to the surrounding environment through a gas permeable surface of the housing 102. In these alternative embodiments, the nozzle 145 may also be used.

Figure 5A:
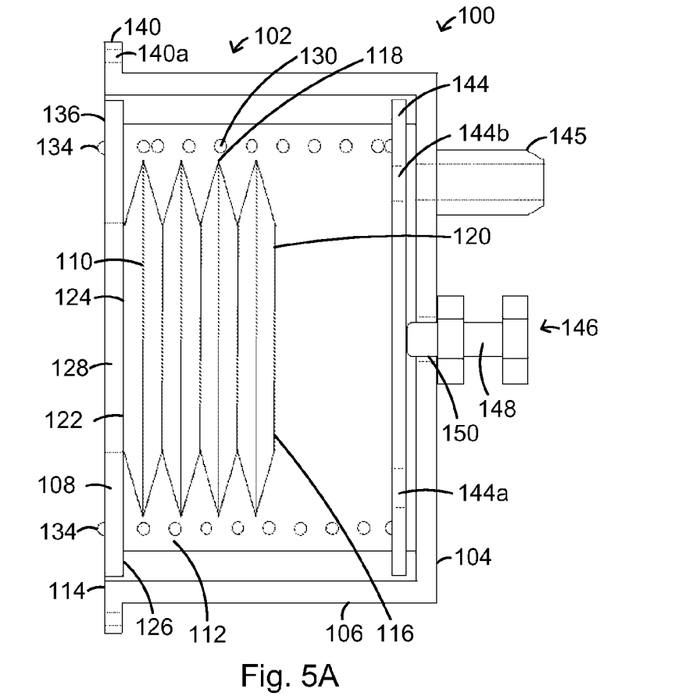
FIGS. 5A-5D are illustrations of an example embodiment of a pressure valve in use with a battery pack (not shown)
Figure 5B:
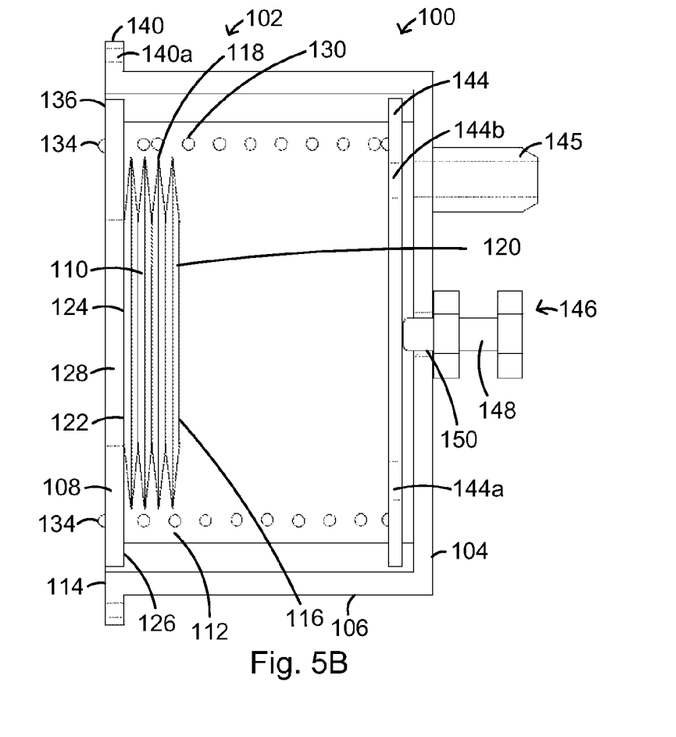
Figure 5C:
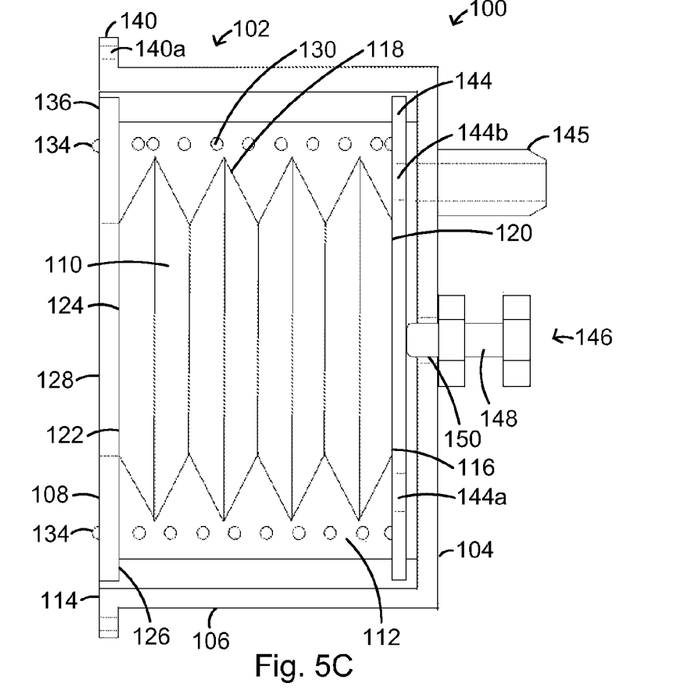
Figure 5D:
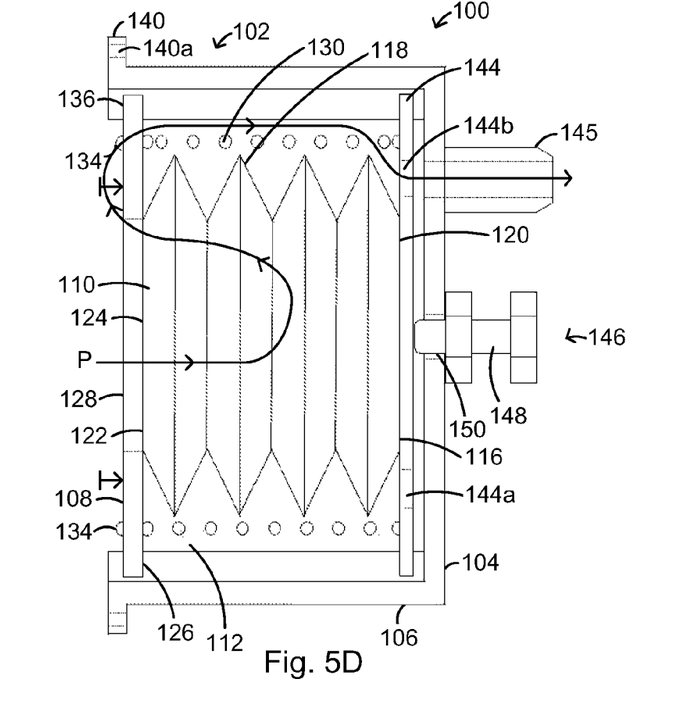

When the first plate 108 is unsealed from the outer surface 132, internal gas from the battery pack 101 may vent to the surrounding environment using a path P (see FIG. 5D). Accordingly, during an outgas event, in addition to the gas flowing through the expansible chamber 110, gas from the inside of the battery pack 101 flows along the path P from between the first plate 108 and the outer surface 132, to between the side wall 118 of the expansible chamber 110 and the side wall 106 of the housing 102 to the opening 142 to the surrounding environment. The first plate 108 may remain unsealed and gas may continue to vent for as long the pressure differential across the first plate 108 is sufficient to overcome the bias strength of the biasing member 130. As gas vents from the housing 103 of the battery pack 101, the gas pressure inside the housing 103 may fall. When the pressure inside the battery pack 101 has fallen below a threshold value, the pressure differential across the first plate 108 generally becomes insufficient to overcome the bias strength of the biasing member 130. The first plate 108 may then reseal against the outside surface 132 stopping this venting of internal gas. In some cases, such as when battery pack 101 continues to produce great amounts of heat, first plate 108 may unseal again. In some cases, the first plate 108 may unseal and reseal repeatedly, until the heat generation by the battery pack 101 lessens.

As described above, the first plate 108 may be biased and operate similarly to a one-way valve for venting gas to the environment. The first plate 108 may also separate from the outer surface 132 and unseal when the internal gas pressure inside battery pack 101 reaches a threshold level. The first plate 108 may then reseal with the outer surface 132 when the internal gas pressure falls below the threshold level. Exterior air and contaminants generally never enter the battery pack 101 because the first plate 108 reseals at a threshold internal gas pressure which is above the ambient pressure and the adjustable pressure of the resilient member 130 maintains the first plate 108 loaded against the outer surface 132 immediately after the outgas event. In some embodiments, the first plate 108 is part of the chamber 110; in other embodiments the first plate 108 can be a separate piece that is attached to the chamber 110. Thus, the battery pack 101 may be protected from contaminants such as moisture and salt that are present in the ambient environment. This may also permit the battery pack 101 to retain a controlled composition of internal gas. For example, the battery pack 101 may comprise Argon gas and not risk dilution by ambient air.

In some cases, it may be desirable to adjust the threshold internal gas pressure above which the first plate 108 unseals from the outer surface 132. The threshold internal gas pressure is dependent upon the force applied by the biasing member 130 onto the first plate 108 toward the outer surface 132. In some embodiments, the force applied by the biasing member 130 may be adjustable.

In the example embodiment shown, the pressure valve 100 comprises a second plate 144. The second plate 144 is generally positioned inside the cavity 112 between the expansible chamber 110 and the bottom wall 104. The biasing member 130 may be held in compression by the first plate 108 and the second plate 144. In some embodiments, the second plate 144 may be movable relative to the bottom wall 104. Accordingly, in some embodiments, the pressure valve 100 comprises an adjustment mechanism 146 for fixedly positioning the second plate 144 relative to the bottom wall 104 and the first plate 108. In the example embodiment shown, the adjustment mechanism 146 comprises an elongated member 148 which extends into cavity 112 through an opening 150 in the bottom wall 104. The elongated member 148 may separate the second plate 144 from the bottom wall 104 by the amount by which the elongated member 148 extends into the cavity 112. The elongated member 148 may be manipulable to adjust the distance that the elongated member 148 extends through the opening 150 thus adjusting the distance between the second plate 144 and the bottom wall 104. For example, the elongated member 148 may comprise threads which engage with threads in opening 150. In some embodiments, there may also be an engagement member in the second plate 144 that engages the elongated member 148. In this example embodiment, the elongated member 148 is generally rotatable to finely adjust the distance that the elongated member 148 extends into the cavity 112.

In at least one embodiment, the second plate 144 comprises channels 144a and 144b, and a plurality of apertures 144c along the outer edge (only one of which is labeled for simplicity of illustration). The channels 144a and 144b are shaped and adapted to allow gas to vent from the battery pack 101 during a gas outflow event. The apertures 144c also aid in providing an extra pathway during a gas outflow event. In an alternative embodiment, the apertures 144c may be closer to the center of the second plate 144 such that the outer edge of the second plate 144 is a continuous circle. In alternative embodiments, there could be more or fewer apertures 144c.

In the example embodiment shown, as the second plate 144 is moved further away from the bottom wall 104, the spring 130 becomes further compressed. This may increase the biasing force applied by the spring 130 to the first plate 108. Accordingly, a greater pressure differential across the first plate 108 is then generally required in order to overcome the higher biasing force from the spring 130. Since the pressure differential across the first plate 108 may be correlated with the difference between the gas pressure inside the battery pack 101 and the ambient pressure of the surrounding environment, the position of the second plate 144 can be used to determine the gas pressure that can overcome the bias strength of the biasing member 130. Accordingly, the adjustment mechanism 146 allows a user to adjust the threshold pressure at which the first plate 108 may move toward the bottom wall 104, unsealing the first plate 108 from the outer surface 132 and allowing internal gas from the battery pack 101 to vent to the environment during an outgas event.

In some cases, the adjustment mechanism 146 may be manipulable to set a threshold pressure value that is outside of normal operating limits. For example, the threshold pressure value may be indicative of a battery failure. Accordingly, when the battery pack 101 operates within normal limits, the first plate 108 may remain in its sealed position with respect to the outer surface 132 of the battery pack 101 and the battery pack 101 may retain a constant quantity of gas.

An example of the dimensions of the pressure valve 100 is that the width and length of the pressure valve dimensions can be the same. For example, the diameter of the housing 102 can range from 1 to 20 cm and the height can also range from 1 to 20 cm. In general, the pressure valve 100 can be configured so that the pressure of the spring 130 can be in the range of 2 psi to 45 psi.

In the example embodiment shown in FIG. 4, the pressure valve 100 is installed to an outer surface 132 of the battery pack 101. However, in other embodiments, the housing 102 of the pressure valve 100 may be integrally formed within the battery pack 101. In still other embodiments, the pressure valve 100 may be installed in the interior of the battery pack 101.

Referring now to FIGS. 5A-5D, shown therein are illustrations of the pressure valve 100 in use with the battery pack 101 (which is not shown but would be to the left of the pressure valve 100).

In FIG. 5A, the pressure valve 100 is in a neutral position in which the gas pressure within the battery pack 101 is in equilibrium with the ambient pressure of the surrounding environment. The end 116 of the bellows 110 is approximately at the halfway position between the first plate 108 and the second plate 144.

In FIG. 5B, the gas pressure within the battery pack 101 is lower than the ambient pressure such that the bellows 110 contracts to increase the pressure within the battery pack 101 to attempt to equalize the interior pressure with the ambient pressure of the surrounding environment.

In FIG. 5C, the gas pressure within the battery pack 101 is higher than the ambient pressure such that the bellows 110 expands to decrease the pressure within the battery pack 101 to attempt to equalize the interior pressure within the battery pack 101 with the ambient pressure of the surrounding environment. However, in the case of FIG. 5D, the interior pressure of the battery pack 101 is so large that the first plate 108 unseals or lifts off of the outer surface 134 of the battery pack 101 such that gas within the battery pack 101 vents to the surrounding environment by following gas pathway P. In particular, as the bellows 110 expands to its maximum limit, the excess interior gas pressure pushes the gas back towards the end 128 of the bellows 110 where it pushes against the first plate 108 lifting it off of the exterior surface 132 of the battery pack 101 and then the gas travels along the gas pathway P through the apertures 138 and then between the side walls 106 and 118 through the apertures 144a, 144b and 144c and then through the aperture 142, through the nozzle 145 to the external environment.

Figure 6A:
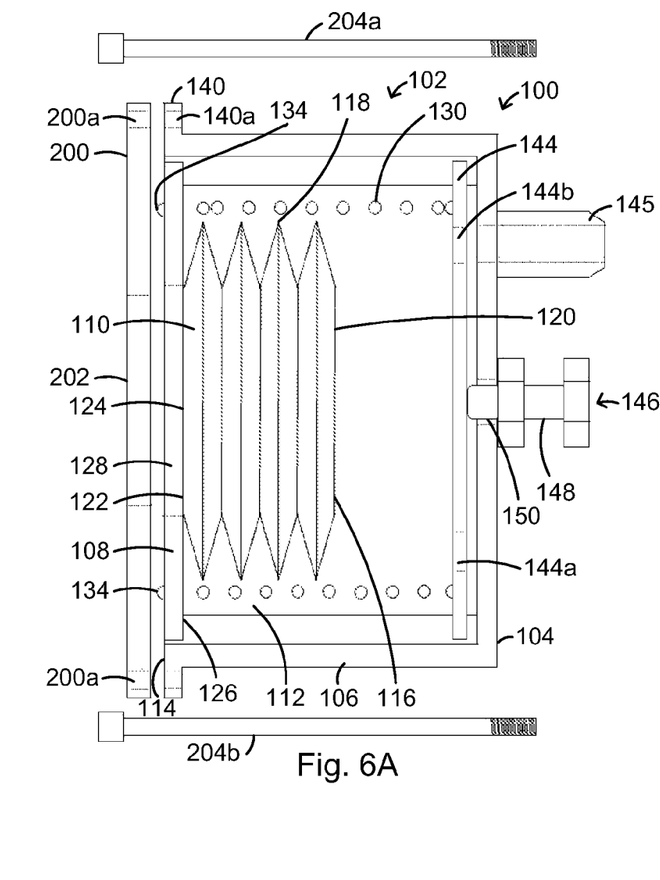
FIGS. 6A-6B are illustrations showing an example of how the pressure valve can be mounted within a battery pack.
Figure 6B:
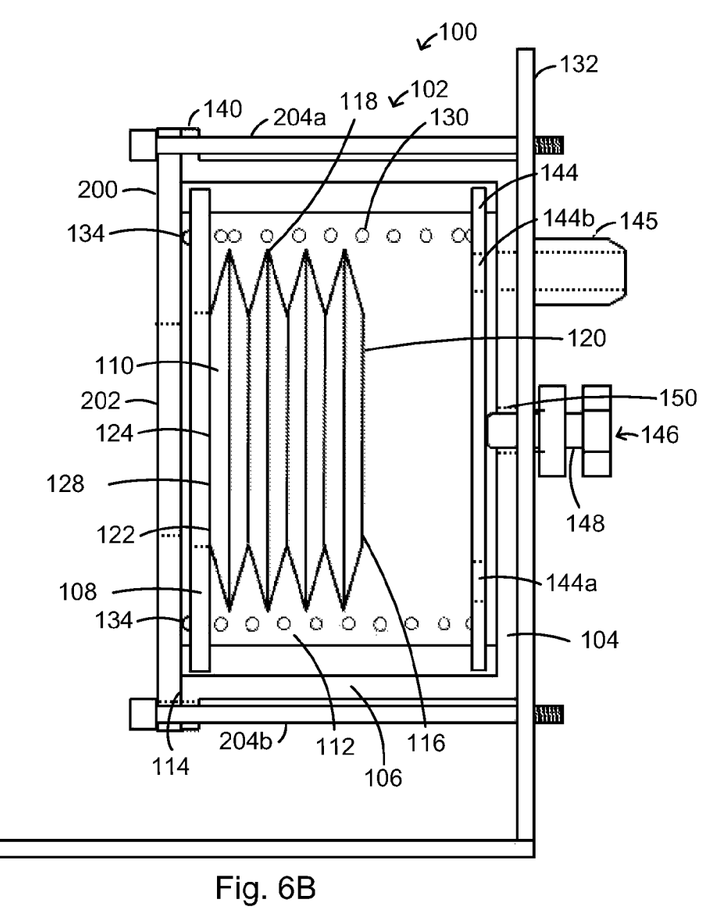

Referring now to FIGS. 6A-6B, shown therein is an example of how the pressure valve 100 can be mounted within the battery pack 101. The pressure valve 100 is mounted to an internal plate 200 that is within the battery pack 101. The internal plate 200 is used to provide a seal against the first plate 108, the open top wall 114 and the sealing member 134.

Accordingly, the internal plate 200 functions as the outer surface 132 of the housing 103 of the battery pack 101 did in the case of an external mounting of the pressure valve 100 to the housing 103 of the battery pack 101. Accordingly, in this example embodiment, the pressure valve 100 operates in a similar manner regardless of whether it is mounted internally or externally with respect to the housing 103 of the battery pack 101.

The internal plate 200 has an aperture 202 that is in fluid communication with the openings 124 and 128. The internal plate 200 also has channels or apertures 200a that align with the apertures 140a of the flange 140 of the pressure valve 100. Two fasteners, in this case bolts 204a and 204b, pass through the apertures 200a and 140a and engage complementary fastening members (i.e. threaded apertures) in the housing 103 of the battery pack 101. In this case, the battery pack 101 also has an aperture to receive the nozzle 145 to vent gas to the surrounding environment. In some embodiments, as shown in FIG. 6B, the battery pack 101 also has an aperture which allows access to the adjustment mechanism 146 to allow the pressure valve 100 to be adjusted from the exterior of the battery pack 101. In this case the access is shaped and adapted to provide a seal around the adjustment mechanism so nothing can enter or exit the battery pack 101 at the access point once the pressure valve 100 has been installed.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims.

The invention claimed is:

1. A pressure valve for a battery pack comprising:
   a housing comprising a first bottom wall and a first sidewall in contact with the first bottom wall to define a cavity;
   a first plate inside the cavity, wherein the first plate comprises a first opening, the first plate being movable relative to the first bottom wall, and the first plate being biased away from the first bottom wall; and
   an expansible chamber positioned inside the cavity between the first bottom wall and the first plate having an opening that is in fluid communication with a gas inside the battery pack, wherein the expansible chamber is deformable in order to contract or expand in response to changes in pressure in the gas within the battery pack.

2. The pressure valve of claim 1, wherein the chamber comprises opposite first and second ends, a closed second bottom at the second end, a second opening at the first end, and a second sidewall extending from the first end toward the second end, the second sidewall being sealed to the first plate at the first end and the second sidewall defining the second opening at the first end, and the second opening overlaps with the first opening.

3. The pressure valve of claim 1, wherein the chamber comprises a bellows having a folding sidewall.

4. The pressure valve of claim 1, wherein the chamber is automatically deformable to increase in volume when the chamber receives gas due to a high gas pressure within the battery pack.

5. The pressure valve of claim 1, wherein the chamber is automatically deformable to decrease in volume when the chamber loses gas due to a low gas pressure within the battery pack.

6. The pressure valve of claim 1, wherein the first plate is biased away from the first bottom wall by a resiliently compressible member.

7. The pressure valve of claim 6, wherein the resiliently compressible member is a spring held in compression between the first bottom wall and the first plate.

8. The pressure valve of claim 6, further comprising a second plate between the first plate and the first bottom wall, wherein the resiliently compressible member is a spring held in compression between the first plate and the second plate.

9. The pressure valve of claim 8, wherein the position of the second plate relative to the first bottom wall is adjustable.

10. The pressure valve of claim 9, further comprising an adjustment mechanism that is manipulable to selectively position the second plate relative to the first bottom wall.

11. The pressure valve of claim 10, wherein the adjustment mechanism comprises an elongated threaded member that is rotatable to extend through a hole in the first bottom wall to engage the second plate.

12. The pressure valve of claim 1, wherein the first plate further comprises a third opening, and the third opening does not overlap with the second opening.

13. The pressure valve of claim 12, wherein the first plate comprises opposite first and second sides, a second sidewall of the chamber is sealed to the first side of the first plate, the first plate comprises a sealing member on the second side, and the sealing member surrounds the first opening intermediate the first opening and the third opening.

14. The pressure valve of claim 6, wherein the first plate comprises opposite first and second sides, a second sidewall of the chamber is sealed to the first side of the first plate, and the first plate is configured to move towards the first bottom wall when a high pressure gas is incident on the second side and exceeds a threshold pressure defined by the resiliently compressible member.

15. The pressure valve of claim 1, wherein the housing further comprises a flange comprising through-holes, and the through-holes are sized to receive connectors to connect the pressure valve to the battery pack.

16. The pressure valve of claim 2, wherein the second sidewall and the second bottom are substantially gas impermeable.

17. The pressure valve of claim 1, wherein the first bottom wall comprises a fourth opening defining a gas outlet.

18. The pressure valve of claim 12, wherein the first bottom wall comprises a fourth opening defining a gas outlet, and the third opening, a space between the chamber and the first sidewall, and the gas outlet together define a gas flow path during a gas outflow event.

19. A pressure valve for a battery pack, wherein the pressure valve comprises:
   a chamber in fluid communication with a gas inside the battery pack, wherein the chamber is deformable to modulate gas pressure inside the battery pack; and
   a plate connected with the chamber, wherein the plate is biased to provide a seal to the battery pack when the gas pressure is below a threshold value; and the plate is biased to unseal from the battery pack, when the gas pressure is greater than the threshold value,
   wherein the gas is sealed from the surrounding environment when the plate is sealed to the battery pack; and the gas vents to the surrounding environment when the plate is unsealed from the battery pack.

* * * * *